United States Patent Office 3,048,524
Patented Aug. 7, 1962

1

3,048,524
PROCESS OF PRODUCING INFECTIOUS BOVINE RHINOTRACHEITIS VACCINE AND PRODUCT THEREOF

Edmund P. Bass, White Hall, Ill., assignor to Affiliated Laboratories Corporation, White Hall, Ill., a corporation of Illinois No Drawing. Filed Mar. 6, 1961, Ser. No. 93,354
7 Claims. (Cl. 167—78)

This invention relates to vaccines and the production of vaccines, and more particularly to a novel infectious bovine rhinotracheitis (I.B.R.) vaccine and process of producing such a vaccine which is effective in immunizing cattle against infectious bovine rhinotracheitis virus.

Briefly, the invention relates to the process of producing attenuated vaccines for immunizing bovines against infectious bovine rhinotracheitis which comprises introducing an inoculum of infectious bovine rhinotracheitis virus into a nontoxic fluid tissue culture medium containing viable cells of bovine tissue, incubating the tissue culture medium until multiplication of the virus has begun, thereafter separating an inoculum of said virus and serially passing the virus through bovine cultures for at least about 20 passages, and then serially passing the resulting virus through canine cultures for at least about 10 passages to further attenuate the virus. The invention also includes the novel vaccine produced by the process of the invention.

Among the several objects of the invention may be noted the provision of a novel vaccine which is effective in immunizing bovines against infectious bovine rhinotracheitis virus; the provision of such a vaccine which is attenuated to an extent that it will not produce symptoms of infectious bovine rhinotracheitis when inoculated into nonimmune bovines but which will stimulate an antibody response effectively immunizing the cattle; the provision of a novel method of producing such a vaccine which involves propagation of the virus on tissue cultures other than natural host cultures or those which might include diseases common to bovines and such cultures; the provision of such a method which produces a vaccine uncontaminated with other bovine or animal viruses which could infect bovines upon administration of the vaccine; and the provision of a method of this character which is safer and more economical than methods used heretofore in producing vaccines of bovine origin. Other objects and features will be in part apparent and in part pointed out hereinafter.

The invention accordingly comprises the products and methods hereinafter described, the scope of the invention being indicated in the following claims.

As is well known, infectious bovine rhinotracheitis is a widespread disease which causes serious economic losses. Heretofore, it has been the practice to control the disease by immunizing the animals with vaccines of bovine or porcine origin. However, the use of vaccines of bovine or porcine origin has been recognized as having certain shortcomings. Thus, the injection of vaccines of such origin into calves results in a reaction in the majority of calves thereby spreading virus infection rather than controlling it. This results from the fact that vaccines of bovine or porcine origin are usually contaminated with bovine or pig viruses which may be present in the tissues at the time such tissues are processed for tissue cultures. Among such undesired viruses, common to both bovines and pigs, may be mentioned virus diarrhea of cattle, mucosal disease of cattle, vesicular stomatitis, foot and mouth disease, teschen disease, and others.

In accordance with the present invention, I have discovered a novel process for producing an attenuated vaccine effective for immunizing bovines against infectious

2 bovine rhinotracheitis, which is uncontaminated with the above-mentioned foreign viruses. This process involves the propagation of infectious bovine rhinotracheitis virus on tissue cultures of bovine kidney cells and further propagation of such virus on tissue cultures of canine kidney cells. More particularly, I have found that infectious bovine rhinotracheitis virus may be successfully propagated on trypsin dispersed monolayer bovine kidney cells in a nontoxic fluid tissue culture medium with cytopathogenic effect and then serially transferred or passed to effect partial attenuation of the virus.

After serially passing the virus on bovine cells for at least about 20 passages, the virus becomes further adapted (i.e., able to grow in an unnatural host) and may thereafter be further propagated and attenuated on cultivated canine tissues or canine tissue cells. After serially passing the virus for at least about 10 passages on canine tissue culture cells, an attenuated vaccine is obtained which will stimulate an antibody response upon injection into bovines without producing symptoms of infectious bovine rhinotracheitis and without spreading foreign viruses.

I have found that the production of vaccine in accordance with the method of the invention eliminates the above noted undesired foreign viruses so that the vaccine obtained is uncontaminated with such foreign viruses. Canine viruses which may be present in the cultivated canine tissues or canine tissue cells employed in my method are not pathogenic to cattle and therefore do not infect cattle to which the vaccine of the invention is administered. The invention accordingly provides a vaccine which safely and effectively immunizes bovines against infectious bovine rhinotracheitis virus without exposing the animals to infection from foreign viruses.

Essentially, my process utilizes the Dulbecco and Vogt modified method and involves incubation of a nutrient fluid tissue culture medium containing tryspin dispersed cells of bovine kidney tissue until a monolayer sheet of cells is formed, replacement of the nutrient fluid tissue culture medium with a maintenance fluid tissue culture medium, inoculation of this medium with infectious bovine rhinotracheitis virus and incubation until a cytopathogenic effect or other indication of virus multiplication is obtained. The propagation or growth of the virus in this manner is usually completed within fifteen days following inoculation with the infectious bovine rhinotracheitis virus. However, the incubation period can be extended for longer periods if desired. The propagated virus is then harvested, identified and titrated by known methods. The harvested virus is then serially passed through other bovine tissue cultures or cell cultures for at least about 20 passages, and further serially passed through canine kidney cells for at least about 10 passages, to effect partial or complete attenuation of the virus.

In propagating and attenuating the virus in accordance with my invention, any nontoxic nutrient fluid tissue culture medium may be utilized. Exemplary of such a medium may be mentioned a medium containing 80% Earle's balanced salt solution, 10% lactalbumin hydrolysate, 10% horse serum, 100 units of penicillin and 0.1 mg. of streptomycin, or a medium containing 88% Earle's balanced salt solution, 2% horse serum, 10% lactalbumin hydrolysate, 100 units of penicillin and 0.1 mg. of streptomycin. It will be understood that other nontoxic nutrient fluid tissue culture media may also be used. Exemplary maintenance fluid tissue culture media which may be used are Parker No. 199 or Eagles medium.

The virus produced by the present invention may be diluted according to the titer or may have added thereto stabilizers or other nontoxic substances. For use as vaccine, the virus may be desiccated or it may be prepared in liquid form.

In administering the vaccine of the invention, it will be understood that the dosage per pound of body weight of cattle may vary depending upon the virus titer of the virus in the vaccine and its antigenic properties.

The following example illustrates the invention:

Attenuated infectious bovine rhinotracheitis vaccine, tissue culture origin, was prepared in accordance with the invention utilizing the Dulbecco and Vogt modified method (Dulbecco, R. and Vogt, M., Journal of Experimental Medicine, 1954, volume 99, page 167) as follows:

Bovine kidneys were used. The cortex was minced with sharp cuticle scissors and was transferred to a 250 ml. Erlenmeyer flask. It was then washed with phosphate buffered saline solution (sodium chloride 8.0 g., potassium chloride 0.2 g., sodium acid phosphate 1.15 g., monobasic potassium phosphate 0.2 g., magnesium chloride 0.1 g., calcium chloride 0.1 g., water to make 1000 ml.) until the supernatant was clear. The mixture was allowed to settle between washings. After the last washing, trypsin (100 ml. of 0.25% solution) was added and the resulting mixture was stirred on a magnetic mixer for one-half hour.

The mixture was allowed to settle and the supernatant was discarded. An additional amount of trypsin (200 ml., 0.25% solution) was next added and the mixture was stirred with a magnetic stirrer in a refrigerator at low speed overnight. After removal from the stirrer, the mixture was transferred to centrifuge bottles (250 ml.) and centrifuged for five minutes at 800 to 1000 r.p.m.

The supernatant was discarded and nutrient fluid tissue culture medium was added. This consisted of 80% Earle's balanced salt solution (phenol red 0.02 g., sodium chloride 6.8 g., potassium chloride 0.4 g., magnesium sulfate 0.21 g., sodium acid phosphate 0.14 g., sodium bicarbonate 2.2 g., glucose 1.0 g., calcium chloride 0.26 g., water to make 1000 ml.), 10% lactalbumin hydrolysate, 10% horse serum, penicillin (100 units/ml.) and streptomycin (0.1 mg./ml.). The cells were resuspended and centrifuged at 600 to 800 r.p.m. for three minutes. The supernatant was siphoned off and the cells were again resuspended and filtered through cheese cloth.

The cells were then transferred to 50 ml. volumetric centrifuge tubes and centrifuged at 600 r.p.m. for three minutes. The cell volume was read and the cells were suspended in the tissue culture medium described above in the proportion of 1 ml. of packed cells to 250 ml. of medium. This cell suspension was then dispensed into a series of tubes and bottles in the proportions: 1 ml. of cell suspension in a test tube; 10 ml. in a 4 oz. bottle; 20 ml. in a 6 oz. bottle and 50 ml. in a 16 oz. bottle.

The containers were next placed in an incubator. After a monolayer sheet of cells was formed (2–8 days), the nutrient fluid was removed and maintenance fluid (Earle's balanced salt solution, 86% lactalbumin hydrolysate, horse serum 4% plus penicillin 100 units/ml.; mycostatin 100 units/ml. and streptomycin 0.1 mg./ml.) was added. The bottles were then inoculated with infectious bovine rhinotracheitis virus. Several uninoculated bottles were retained as controls. All of the bottles were then placed in an incubator and left there until a cytopathogenic effect was produced on the tissue in the bottles inoculated with infectious bovine rhinotracheitis virus (usually on the third to twelfth day). No degenerative changes occurred in the control bottles.

The bottles were removed from the incubator, checked for cytopathogenic effect, and then harvested in a common container. New bottles containing a monolayer sheet of cells obtained as described above were then inoculated with the harvested virus to serially pass the virus. If desired, the virus may be stored in a frozen condition and then inoculated into new bottles containing tissue cultures when the latter are available.

The virus is serially passed for at least 20 passages on bovine cells and at least about 10 passages on canine cells to attenuate the virus to the extent that it will stimulate an antibody response in cattle without producing symptoms of infectious bovine rhinotracheitis. While virus serially passed for less than a total of 30 passages may be effective in immunizing cattle against infectious bovine rhinotracheitis, virus serially passed for at least 40 passages may be safely used in immunizing all susceptible bovines.

Virus propagated as described above and serially transferred for 30 passages on bovine kidney cells and 10 on canine kidney cells was successfully employed to vaccinate calves against infectious bovine rhinotracheitis. Thirty calves, susceptible to infectious bovine rhinotracheitis, were employed in the test. Twenty of these calves were administered 1 ml. intramuscularly of the 10th canine passage of the tissue culture virus only. They did not show any symptoms of infectious bovine rhinotracheitis or temperature reaction. On the 21st day following vaccination they were challenged with a 2 ml. dose of virulent infectious bovine rhinotracheitis virus. The calves remained well and exhibited no reaction of any kind throughout a two week observation period, while the unvaccinated controls sickened and developed typical symptoms of infectious bovine rhinotracheitis.

In view of the above, it will be seen that the several objects of the invention are achieved and other advantageous results attained.

As various changes could be made in the above methods and products without departing from the scope of the invention, it is intended that all matter contained in the above description shall be interpreted as illustrative and not in a limiting sense.

I claim:

1. The process of producing an attenuated vaccine for immunizing bovines against infectious bovine rhinotracheitis which comprises introducing an inoculum of infectious bovine rhinotracheitis virus into a nontoxic fluid tissue culture medium containing viable cells of bovine kidney tissue, incubating said tissue culture medium until multiplication of the virus has begun, thereafter separating an inoculum of said virus and serially passing the virus through bovine kidney cultures for at least about 20 passages, and then serially passing the resulting virus through canine kidney cultures for at least about 10 passages to attenuate the virus.

2. The process of producing an attenuated vaccine for immunizing bovines against infectious bovine rhinotracheitis which comprises introducing an inoculum of infectious bovine rhinotracheitis virus into a nontoxic fluid tissue culture medium containing a growth of cells of bovine kidney tissue, incubating said tissue culture medium until multiplication of the virus has begun, thereafter separating an inoculum of said virus and serially passing the virus through bovine kidney cultures for at least about 20 passages, and then serially passing the resulting virus through canine kidney cultures for at least about 10 passages to attenuate the virus.

3. The process of producing an attenuated vaccine for immunizing bovines against infectious bovine rhinotracheitis which comprises incubating a nontoxic fluid nutrient tissue culture medium containing viable cells of bovine kidney tissue until a monolayer sheet of cells is formed, replacing said nutrient tissue culture medium with a maintenance fluid tissue culture medium, introducing an inoculum of infectious bovine rhinotracheitis virus into said maintenance fluid tissue culture medium, incubating said maintenance tissue culture medium until multiplication of the virus has begun, thereafter separating an inoculum of said virus and serially passing the virus through bovine kidney cultures for at least about 20 passages, and then serially passing the resulting virus through canine kidney cultures for at least about 10 passages to attenuate the virus.

4. The process of producing an attenuated vaccine for immunizing bovines against infectious bovine rhinotracheitis which comprises incubating a nontoxic nutrient fluid tissue culture medium containing viable cells of bovine kidney tissue until a monolayer sheet of cells is formed, replacing said nutrient fluid tissue culture medium with a maintenance fluid tissue culture medium, introducing an inoculum of infectious bovine rhinotracheitis virus into said maintenance fluid tissue culture medium, incubating said maintenance fluid tissue culture medium until multiplication of the virus has begun, thereafter separating an inoculum of said virus and serially passing the virus through bovine kidney cultures for approximately 30 passages and then serially passing the resulting virus through canine kidney cultures for approximately 10 passages to attenuate the virus.

5. The process of producing an attenuated vaccine for immunizing bovines against infectious bovine rhinotracheitis which comprises incubating a nontoxic nutrient fluid tissue culture medium consisting of a balanced salt solution plus minor quantities of serum and antibiotics and containing viable cells of bovine kidney tissue until a monolayer sheet of cells is formed, replacing said nutrient fluid tissue culture medium with a maintenance fluid tissue culture medium, introducing an inoculum of infectious bovine rhinotracheitis virus into said maintenance fluid tissue culture medium, incubating said maintenance fluid tissue culture medium until multiplication of the virus has begun, thereafter separating an inoculum of said virus and serially passing the virus through bovine kidney cultures for at least about 20 passages and then serially passing the resulting virus through canine kidney cultures for at least about 10 passages to attenuate the virus.

6. The process for producing an attenuated vaccine for immunizing bovines against infectious bovine rhinotracheitis which comprises incubating a nontoxic nutrient fluid tissue culture medium consisting of a balanced salt solution plus minor quantities of serum and antibiotics and containing viable cells of bovine kidney tissue until a monolayer sheet of cells is formed, replacing said nutrient fluid tissue culture medium with a maintenance fluid tissue culture medium, introducing an inoculum of infectious bovine rhinotracheitis virus into said maintenance fluid tissue culture medium, incubating said maintenance fluid culture medium until multiplication of the virus has begun, thereafter separating an inoculum of said virus and serially passing the virus through cultures of bovine kidney cells for approximately 30 passages and then serially passing the resulting virus through cultures of canine kidney cells for approximately 10 passages to attenuate the virus.

7. An infectious bovine rhinotracheitis virus containing a plurality of tissue culture infectious doses of virus per ml. capable of stimulating the production of protective infectious bovine rhinotracheitis antibodies when injected into nonimmune bovines without producing the usual symptoms of infectious bovine rhinotracheitis, made by the process of claim 1.

References Cited in the file of this patent

UNITED STATES PATENTS

| 2,934,473 | York | Apr. 26, 1960 |
| 2,941,925 | York | June 21, 1960 |

OTHER REFERENCES

Cheatham: Proc. Soc. Exptl. Med., vol. 96, No. 2, pages 536–8, 1957.

Tousimis: Proc. Soc. Exptl. Med., vol. 99, No. 3, pages 614–616, 1958.

York: Proc. Soc. Exptl. Med., vol. 94, No. 3, pages 740–744, 1957.